US012236923B2

(12) United States Patent
Moye

(10) Patent No.: US 12,236,923 B2
(45) Date of Patent: Feb. 25, 2025

(54) PORTABLE MUSIC PRODUCTION APPARATUS

(71) Applicant: Alex Matthew Moye, Ponte Vedra Beach, FL (US)

(72) Inventor: Alex Matthew Moye, Ponte Vedra Beach, FL (US)

(73) Assignee: Alex Moye, Ponte Vedra Beach, FL (US)

( * ) Notice: Subject to any disclaimer, the term of this patent is extended or adjusted under 35 U.S.C. 154(b) by 632 days.

(21) Appl. No.: 17/368,865

(22) Filed: Jul. 7, 2021

(65) Prior Publication Data

US 2023/0012028 A1 Jan. 12, 2023

(51) Int. Cl.

*G10H 1/055* (2006.01)
*G10H 1/00* (2006.01)
*G10H 1/14* (2006.01)
*G10H 1/34* (2006.01)
*G10H 1/46* (2006.01)

(52) U.S. Cl.

CPC ........... *G10H 1/0008* (2013.01); *G10H 1/055* (2013.01); *G10H 1/14* (2013.01); *G10H 1/34* (2013.01); *G10H 2210/066* (2013.01); *G10H 2210/325* (2013.01); *G10H 2220/161* (2013.01); *G10H 2240/285* (2013.01)

(58) Field of Classification Search

CPC ........ G10H 1/055; G10H 1/0558; G10H 1/14; G10H 1/34; G10H 2210/325; G10H 2240/285; G10H 1/0008

See application file for complete search history.

(56) References Cited

U.S. PATENT DOCUMENTS 5,850,051 A * 12/1998 Machover ................ G10H 1/36 84/613

OTHER PUBLICATIONS

AllenandHeathUK; Xone:K2—Tutorial: Traktor Mapping Pots & Faders; https://www.youtube.com/watch?v=svdlrtpbqYo; accessed Dec. 1, 2023; published May 3, 2012. (Year: 2012).*
Sanjay C; M Audio Oxygen Pro—Before you buy it, watch this | Oxygen Pro Review; https://www.youtube.com/watch?v=-Ps-0R_pKhl; accessed Dec. 1, 2023; published Jan. 3, 2021. (Year: 2021).*
Korg; Patch of the Week 106: Setting Reverb to Mod Wheel in opsix; https://www.youtube.com/watch?v=N3OeCrjNXVE; accessed Dec. 1, 2023; published Apr. 23, 2021. (Year: 2021).*
Behringer; Introducing Behringer SWING; https://www.youtube.com/watch?v=Vtwwlv60Vkg&t=41s; accessed Dec. 1, 2023; published Nov. 22, 2020. (Year: 2020).*
Novation; https://www.youtube.com/watch?v=aYHUp8SYu-k; accessed Dec. 3, 2023; published Jul. 10, 2019. (Year: 2019).*
Sound on Sound; "Standalone expression controllers;" https://www.soundonsound.com/forum/viewtopic.php?t=77091; web forum discussion; accessed on Dec. 4, 2023; published Mar. 22, 2021. (Year: 2021).*

(Continued)

*Primary Examiner* — Daniel J Colilla

(57) ABSTRACT

The present disclosure provides a portable music production apparatus which a USB interface for connecting to a computer device, the apparatus comprises a first control element which is configured to provide a pitch bend functionality and a second control element which can be assigned to modulate any parameter a user desires like a modulation wheel. The apparatus can also be provided with additional programmable control elements.

10 Claims, 2 Drawing Sheets

(56) References Cited

OTHER PUBLICATIONS

Yamaha MCS2 MIDI control station; https://yamahablackboxes.com/collection/yamaha-mcs2-midi-control-station/; accessed on Dec. 4, 2023; published Apr. 13, 2021. (Year: 2021).*
Atemp product website; https://atemp.ru/en/products/atemp_mc1.html; accesses Mar. 11, 2024; published Jan. 25, 2021. (Year: 2021).*

* cited by examiner

PORTABLE MUSIC PRODUCTION APPARATUS

FIELD OF INVENTION

The present invention relates generally to improvements in equipment for assisting with music production. More specifically, the present invention relates to a portable apparatus for interfacing with an external device to provide additional music production functionalities.

BACKGROUND

The majority of modern-day music production is done via electronic music production environments which are installed on computer devices such as a laptops and PCs. These devices have great processing capabilities for adding and modulating audio parameters and effects, and the dedicated software which runs the music production environments provides excellent and versatile interfaces for applying these effects.

Naturally, there are many functionalities that computer devices do not have the hardware to perform, such as functionalities requiring pressure-sensitive or analog inputs. Thus, music production suites usually comprise at least one computer device interfacing with a multitude of musical instruments and modulation panels.

One famous and versatile tool used in conjunction with music production environments is the MIDI keyboard, which has a host of modulation controls as well as an actual keyboard instrument that can be programmed to produce the sounds of almost any instrument.

While versatile, the MIDI keyboard and similar equipment on the market such as that disclosed by WO2007100798A2 are expensive and lack portability. Music producers often need to work in confined spaces or while travelling, and such solutions are not practical in these cases. Alternative solutions include those which are entirely virtual with dedicated software installed on tablet devices with touch-sensitive interfaces, such as that disclosed by US2012071994A1. Many music production professionals are known however to prefer equipment with physical control inputs, since the work is quite intuitive and a certain amount of tactile feedback is lost when working entirely through a touch sensitive screen.

It is within this context that the present invention is provided.

SUMMARY

The present disclosure provides a portable music production apparatus which a USB interface for connecting to a computer device, the apparatus comprises a first control element which is configured to provide a pitch bend functionality and a second control element which can be assigned to modulate any parameter a user desires like a modulation wheel. The apparatus can also be provided with additional programmable control elements.

Thus, according to one aspect of the present disclosure there is provided a music production apparatus, comprising: a housing; a first control element disposed on an exterior surface of the housing; a second control element disposed on the exterior surface of the housing; a controller disposed within the housing and connected to the first control element and the second control element; and a USB connection configured to communicate an output from the controller to a connected external device and communicate one or more instructions from a connected external device to the controller.

The controller is configured to receive an instruction indicating an audio parameter to assign to the second control element, and the controller further being configured to, upon receiving an input signal from the first control element, determine and output a pitch variation value through the USB connection and, upon receiving an input signal from the second control element, determine and output a modulation value for the assigned audio quality through the USB connection.

In some embodiments, the controller is a microcontroller.

In some embodiments, the apparatus further comprises a power source.

In other embodiments, the apparatus is configured to receive power from the USB connection.

In some embodiments, one or both of the first control element and the second control element comprise touch-sensitive interfaces.

In other embodiments, one or both of the first control element and the second control element comprise one of a toggle, wheel, or joystick.

In some embodiments, the apparatus further comprises one or more additional control elements connected to the controller, and wherein the controller is further configured to receive instructions to assign a different audio parameter to each of the one or more additional control elements, and upon receiving an input signal from the one or more additional control elements, to determine and output a modulation value for the corresponding assigned audio parameter through the USB connection.

The one or more additional control elements may comprise one or more potentiometers.

In some embodiments, the apparatus further comprises one or more aftertouch effect control elements which are force sensitive and which are connected to the controller, and wherein the controller is further configured to receive instructions indicating an effect to be applied to an audio parameter in response to receiving an input from the one or more aftertouch effect control elements, the controller being configured to modulate intensity of the effect in proportion to the force applied to the one or more aftertouch effect control elements.

The effect may be selected from one of a vibrato effect, a filter effect, a volume modulation effect, or a frequency modulation effect.

BRIEF DESCRIPTION OF THE DRAWINGS

Various embodiments of the invention are disclosed in the following detailed description and accompanying drawings.

Figure 1:
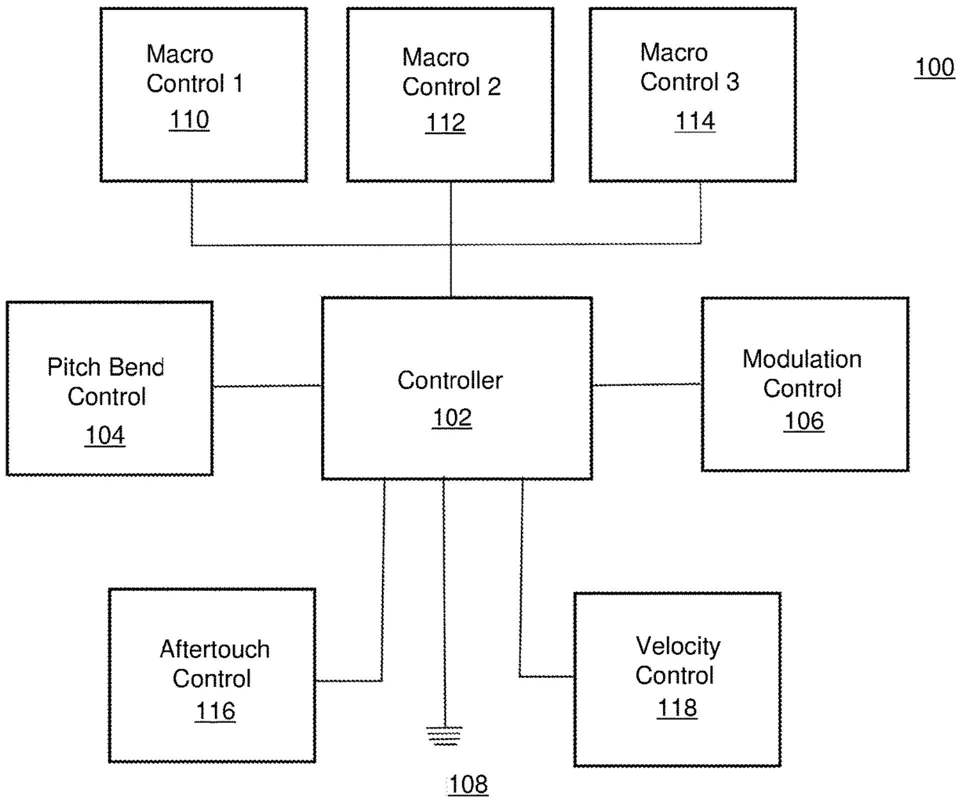
FIG. 1 illustrates a block diagram view of an example configuration of circuit components of the disclosed music production apparatus.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present disclosure provides a highly portable and versatile music production apparatus which is both simple and cheap to manufacture due to its design, without compromising on the ability to add functionality to a music production suite or software program of a connected computer device.

Referring to FIG. 1, a block diagram of an example circuit configuration for the disclosed apparatus 100 is shown which incorporates multiple parameter modulation controls.

The apparatus 100 comprises a controller 102 which may be a microprocessor or smart-chip, which is connected to various control elements operable by a user, and which is configured to receive input signals from the connected control elements and determine based on the input signals a level of modulation to apply to a given audio parameter associated with the control elements the signals are received from.

The device always comprises a first control element 104 that operates as a pitch bend control, with the degree to which the control is turned or pressed by a user determining a level of pitch adjustment to be applied to an audio file. The device also always comprises a second control element 106 referred to as a modulation control which can be programmed to make equivalent adjustments to any parameter desired based on the degree of force applied in pressing/turning the control by the user. In some examples the modulation control 106 is a modulation wheel as can be found on traditional synthesizer keyboards.

Once the controller 102 has determined a level of modulation to apply to a given parameter based on a received input signal from one of the control elements, it outputs this information via USB connection 108 to a connected computer device operating music production software, thus the apparatus 100 functions as an extension of the connected computing device in use of the music production software, providing analog and pressure-sensitive inputs for modifying certain parameters of an audio file in a manner that the binary keys of a laptop or PC computer is unable to.

The controller 102 is further configured to receive settings instructions from connected computer devices, indicating which parameter the modulation control 106 modifies when operated.

Furthermore, the apparatus 100 may comprise several additional control inputs which can be programmed to modify other audio parameters. These additional inputs are referred to as macro control 1 110, macro control 2 112, and macro control 3 114. Generally, these macro controls take the form of potentiometers, but they could also take similar forms to pitch bend control 104 and modulation control 106. Fewer or additional macro controls may be implemented if desirable.

The apparatus may also further comprise an "aftertouch" effect control element 116 which is force sensitive. Aftertouch is a known concept of pushing down harder on a set of keys after they have already been pressed down to produce a predetermined effect. The aftertouch control 116 would emulate this by combining with the pressing down of binary keys on a computer device which are not force sensitive, with an input signal from the aftertouch control 116 being configured to apply a predetermined effect to a sound that was initially produced by pressing a key on the computer device, at a level determined by the amount of force applied to the control 116 by a user. For example, the effect may be selected from one of a vibrato effect, a filter effect, a volume modulation effect, or a frequency modulation effect. Varying pressure levels will yield varying results in the sound effect.

Volume modulation may alternatively be handled by a velocity control 118. Velocity controls are another known concept where hitting a note on a keyboard softly causes the note to play quietly and vice versa—when hitting a note hard, the note plays louder. This functionality does not exist on regular computing devices, leaving producers with a flat sounding production. The velocity control 118 would allow producers to play notes with one hand and adjust the velocity with the other hand, or predetermine the velocity level before recording.

Of course, the apparatus 100 does not need to comprise all of these additional features. An advantage of the apparatus 100 is the ability to provide computing devices with increased functionality despite a simple design.

Figure 2:
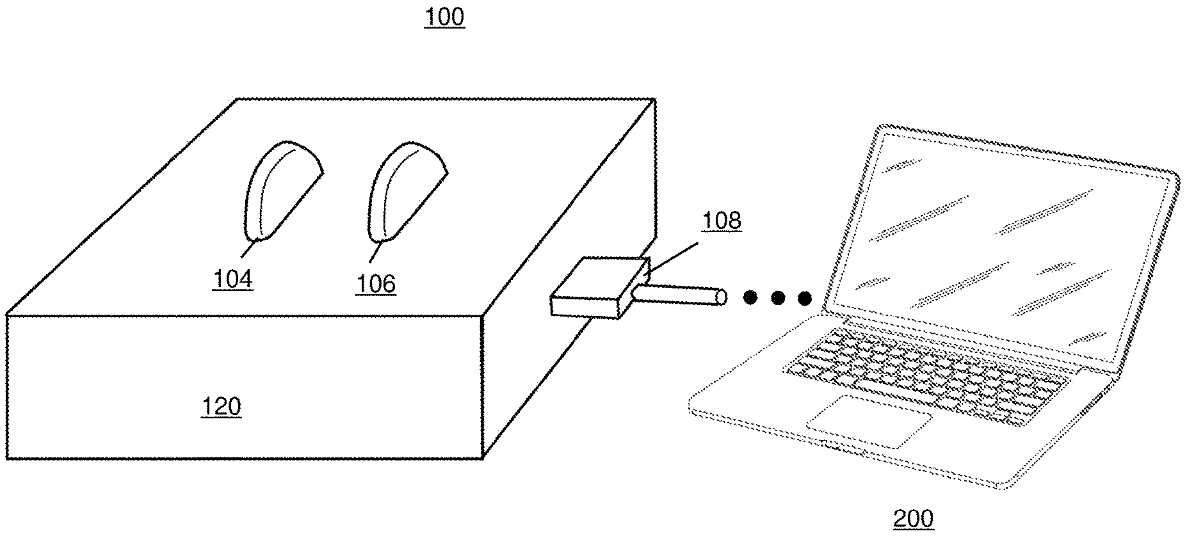
FIG. 2 illustrates an isometric view of a first example configuration of a music production apparatus according to the present disclosure in communication with a laptop computer.

Thus, referring to FIG. 2, a simple configuration of the apparatus 100 is shown in communication with an external computing device 200.

As can be seen, the apparatus 100 comprises the pitch bend control 104 and modulation control 106 in the from of simple actuatable control elements such as toggles, wheels, or joysticks, which are partially exposed on the surface of a housing 120 that contains the controller and other circuitry. A USB connection provides the interface between the computing device 200 and the apparatus 100.

The USB connection 108 may also serve as the power input for the apparatus 100, or the apparatus 100 may have its own separate power source.

Figure 3:
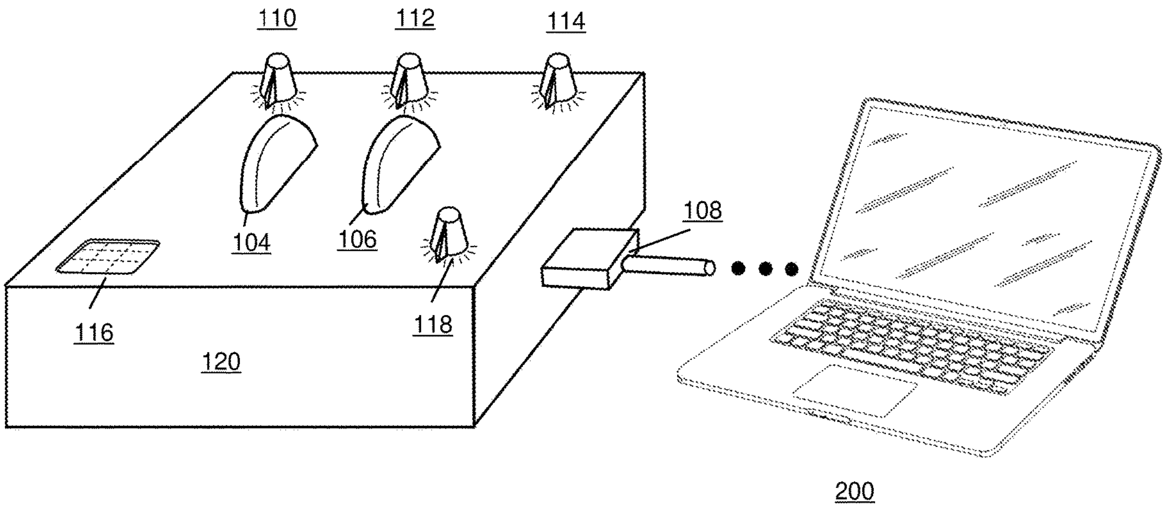
FIG. 3 illustrates an isometric view of a second example configuration of a music production apparatus according to the present disclosure in communication with a laptop computer.

Referring to FIG. 3, a more sophisticated configuration of the apparatus 100 is shown, including additional potentiometer-based macro controls 110, 112, and 114, as well as the aftertouch control 116 and velocity control 118 discussed above.

Figure 4:
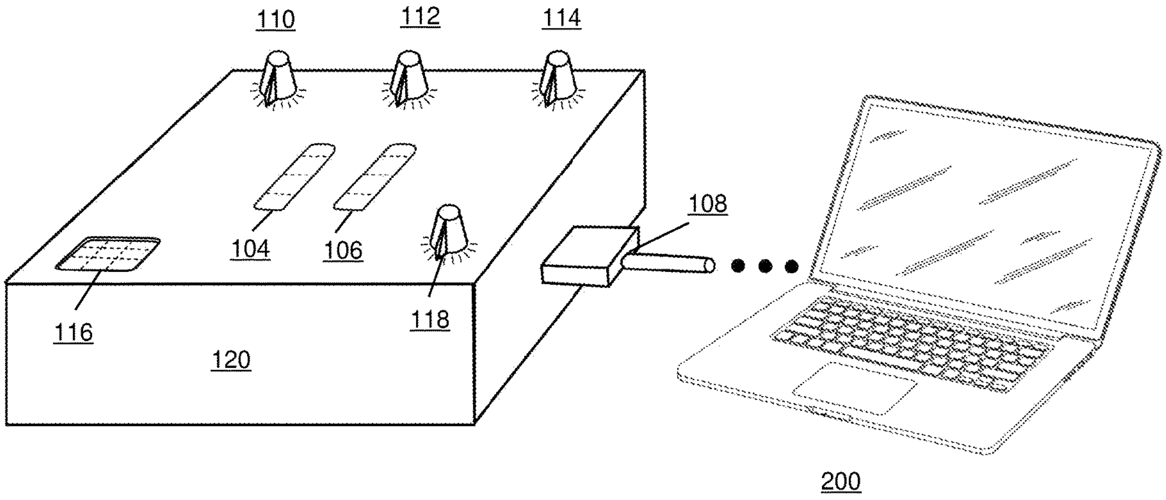
FIG. 4 illustrates an isometric view of a third example configuration of a music production apparatus according to the present disclosure in communication with a laptop computer.

Referring to FIG. 4, a similar configuration to FIG. 3 is shown, with the pitch bend control 104 and modulation control 106 taking the from of touch sensitive ribbons.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the music production apparatus have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A music production apparatus, comprising:

a housing;

a first control element disposed on an exterior surface of the housing;

a second control element disposed on the exterior surface of the housing;

a controller disposed within the housing and connected to the first control element and the second control element; and a USB connection configured to communicate an output from the controller to a connected external computer device and communicate one or more instructions from the connected external computer device to the controller;

wherein the controller is configured to receive an instruction indicating an audio parameter to assign to the second control element, and the controller further being configured to, upon receiving an input signal from the first control element, determine and output a pitch variation value through the USB connection and, upon receiving an input signal from the second control element, determine and output a modulation value for the assigned audio parameter through the USB connection; and wherein the controller is configured to process and output only signals related to modulation and after-effects for music production, without generating primary audio signals from mechanical input actions;

and wherein the apparatus comprises no other connections to external devices besides the USB connection to the external computer device.

2. A music production apparatus according to claim 1, wherein the controller is a microcontroller.

3. A music production apparatus according to claim 1, wherein the apparatus further comprises a power source.

4. A music production apparatus according to claim 1, wherein the apparatus is configured to receive power from the USB connection.

5. A music production apparatus according to claim 1, wherein one or both of the first control element and the second control element comprise touch-sensitive interfaces.

6. A music production apparatus according to claim 1, wherein one or both of the first control element and the second control element comprise one of a toggle, wheel, or joystick.

7. A music production apparatus according to claim 1, wherein the apparatus further comprises one or more additional control elements connected to the controller, and wherein the controller is further configured to receive instructions to assign a different audio parameter to each of the one or more additional control elements, and upon receiving an input signal from the one or more additional control elements, to determine and output a modulation value for the corresponding assigned audio parameter through the USB connection.

8. A music production apparatus according to claim 7, wherein the one or more additional control elements comprise one or more potentiometers.

9. A music production apparatus according to claim 1, wherein the apparatus further comprises one or more aftertouch effect control elements which are force sensitive and which are connected to the controller, and wherein the controller is further configured to receive instructions indicating an effect to be applied to an audio parameter in response to receiving an input from the one or more aftertouch effect control elements, the controller being configured to modulate intensity of the effect in proportion to the force applied to the one or more aftertouch effect control elements.

10. A music production apparatus according to claim 9, wherein the effect is selected from one of a vibrato effect, a filter effect, a volume modulation effect, or a frequency modulation effect.

* * * * *